Feb. 14, 1933.    G. L. PHILLIPPE    1,897,711
FISHING REEL
Filed May 23, 1931    3 Sheets-Sheet 1
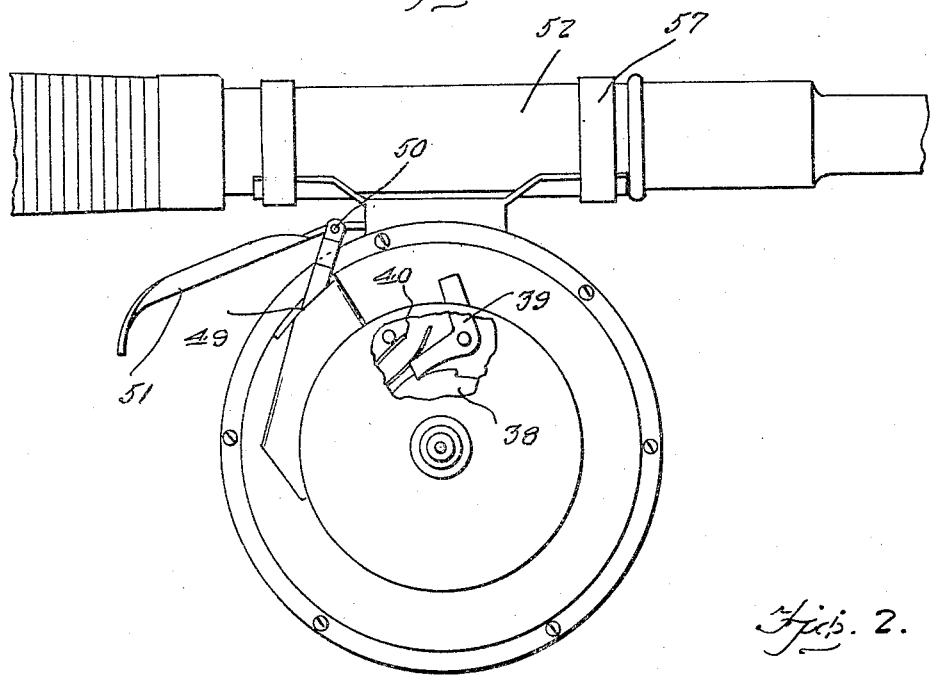
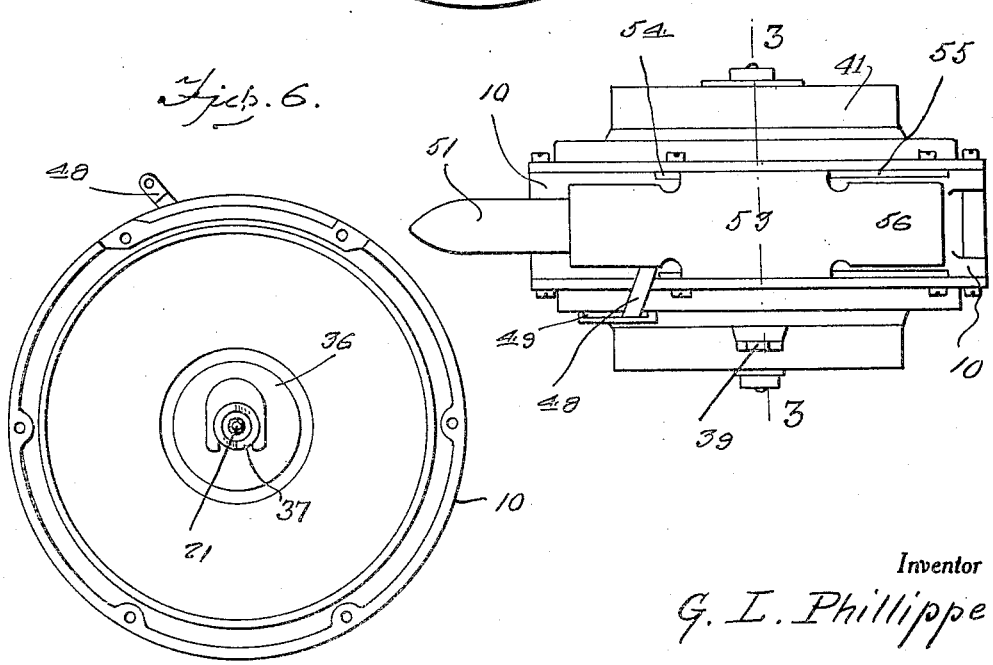
Inventor
G. L. Phillippe
By Clarence A. O'Brien
Attorney Feb. 14, 1933.　　　G. L. PHILLIPPE　　　1,897,711
FISHING REEL
Filed May 23, 1931　　　3 Sheets-Sheet 2

Inventor
G. L. Phillippe

By Clarence A. O'Brien
Attorney

Feb. 14, 1933.    G. L. PHILLIPPE    1,897,711
FISHING REEL
Filed May 23, 1931    3 Sheets-Sheet 3

Inventor
G. L. Phillippe
By Clarence A. O'Brien
Attorney

Patented Feb. 14, 1933

1,897,711

UNITED STATES PATENT OFFICE

GEORGE LOUIS PHILLIPPE, OF HARLOWTON, MONTANA

FISHING REEL

Application filed May 23, 1931. Serial No. 539,570.

This invention relates to certain new and useful improvements in fishing reels, and the primary object of this invention is to provide a reel that is automatic in its operation.

A still further object of the invention is to provide a reel for the purpose above mentioned, that is capable of greater "line" capacity than reels formerly used for this purpose.

A still further object of the invention is to provide an improved braking device for the reel whereby the "paying out" of the line may be controlled by the fisherman.

A still further object of the invention is to provide a reel that is relatively narrow, and which may be suspended from the handle of the fishing rod, projecting but slightly laterally from opposite sides of the rod so as to afford perfect balance and to serve to prevent the fishing rod rotating or turning in the hand of the fisherman.

Other objects and advantages of the invention will become apparent from a study of the following description, taken in connection with the accompanying drawings wherein:

Figure 1 is a side elevational view of the reel, the same being shown as applied to the handle of a fishing rod.

Figure 2 is a top plan view of the reel per se.

Figure 6 is a view looking toward the spring side of the reel with the side member 12 and the spring carrying member 16 removed to show the spool or drum.

Figure 3:
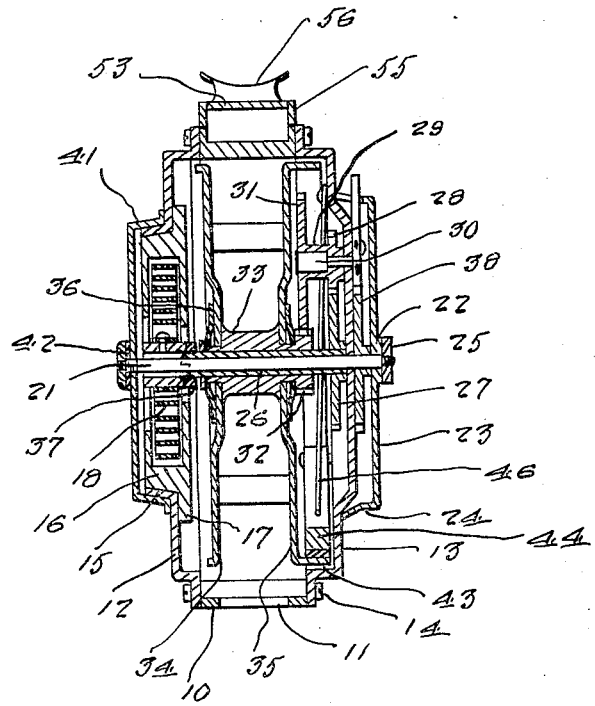
Figure 3 is a vertical transverse sectional view taken through the reel the section being taken on line 3—3 of Fig. 2.

Referring more in detail to the drawings, it will be seen that the improved reel comprises an annular member 10 provided with circumferentially spaced openings 11 for accommodating the fishing line. The member 10 is secured to and disposed between a pair of opposed side plates 12, 13, clamping bolts 14 securing the ring 10 and plates 12, 13 in assembled relation. As shown the bolts 14 pass through bosses provided internally of the ring 10, and through the plates 12 and 13 at the peripheral edges of the plates.

Figure 9:
Figure 9 is a perspective view of a clutch member, showing the manner of anchoring one end of the winding spring thereto.

The plate 12 is provided with a centrally located opening having an annular flange 15 extending about said opening, the bore of the flange being conical as suggested in Figure 3. Supported within the confines of the flange 13 is a disk 16 provided on its inner side with a flange 17 engaging the inner face of the plate 12. The member 16 is provided with a circular recess within which is located a rolled winding spring 18 that has one end thereof suitably anchored within the recess or chamber of the member 16, and the other end thereof anchored to a combined hub and clutch member 19 as at 20. (See Figure 9.) The combined hub and clutch member 19 is keyed to a shaft 21 one end of which is suitably journalled in a bearing provided centrally of the plate 13 and in a bearing 22 provided in a disk 23. Disk 23 is provided with an annular flange 24 directed inwardly and engaging with the outer face of the plate 13.

A suitable retaining nut 25 is threadedly engaged with said end of the shaft 21. Rotatably mounted on the shaft 21 is a sleeve 26 that at one end is equipped with a gear wheel 27 that is in mesh with a pinion 28 provided on one end of a hub 29. Hub 29 is rotatable on a pin 30 suitably supported on plate 13 eccentrically of the plate and at its opposite end is provided with a relatively large gear wheel 31. The gear wheel 31 is in mesh with a pinion 32 provided on one end of the winding spool 33 that is loosely mounted on the sleeve 26.

Fixedly secured to the spool 33 are a pair of relatively spaced guide plates or disks 34, 35 and said spool also carries the spring washers 36. (See Figure 3.)

The free end of sleeve 26 has threadedly engaged therewith a clutch member 37 cooperable with the clutch member 19 for transmitting movement to the sleeve 26 when the spring 18 is unwinding. During the unwinding of the spring 18, the movement of sleeve 26 is transmitted to the spool 13 for winding the fish line (not shown) on to the spool, through the medium of the gears 27, 28, 31 and 32 as will be apparent from a study of Figures 3 and 4.

To prevent retroactive movement of the sleeve 26 during winding of the spring 18, there is fixed on the shaft 21 between the disk 23 and plate 13, a ratchet wheel 38 normally engaged by one end of a pivotally mounted dog 39, the free end of which dog extends through and is operable in a slot provided in the flange 24. The dog 39 is normally urged into engagement with the ratchet wheel 38 through the medium of a suitable spring 40.

Figure 4:
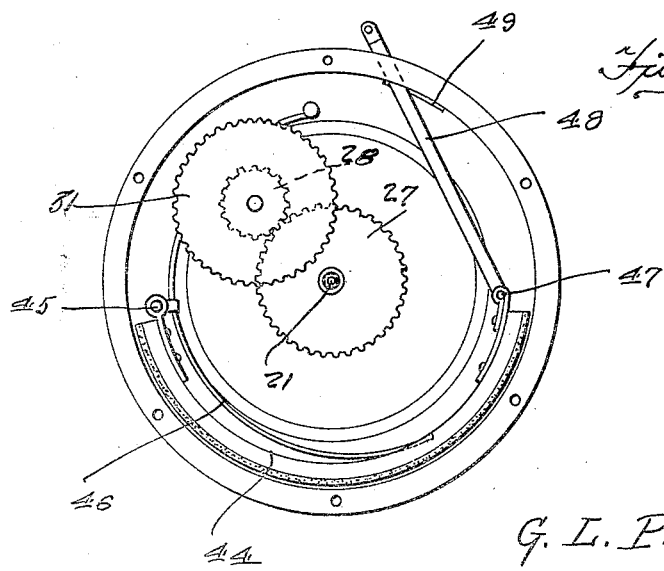
Figure 4 is an elevational view with its side member removed to show the gears and brake.
Figure 5:
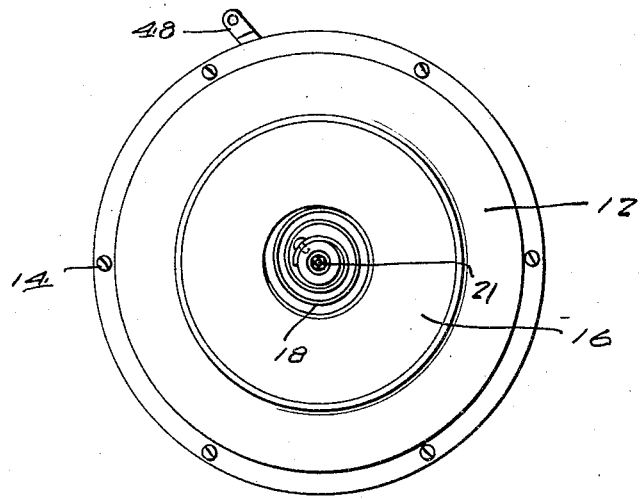
Figure 5 is a view looking toward the spring side of the reel with the winding cap 41 removed.
Figure 8:
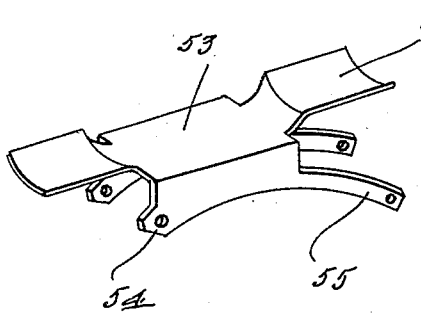
Figure 8 is a perspective view of the suspension bracket.
Figure 7:
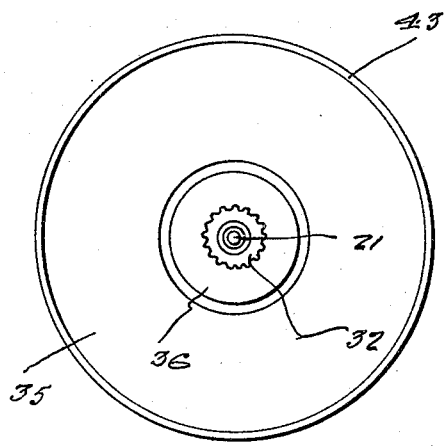
Figure 7 is a side view of the winding drum or spool and looking towards that side which carries the gear or pinion 32.

To facilitate winding of the spring 18, there is provided on that end of the shaft 21 adjacent the plate 12, a circular shell like winding knob 41 secured as at 42 to said end of the shaft, and as shown in Figure 3, the knob 41 is provided with a peripheral flange which telescopes over the flange 15. Obviously by rotating the knob 41 in one direction, the shaft 26 will be rotated for winding the spring 18. The automatic paying out of the fishing line, may be manually controlled through the medium of manually operable braking means which in the present instance consists of providing the guide disk 35 with an outwardly directed circular flange 43 with which is engaged an arcuate brake shoe 44 pivoted at one end as at 45. The brake shoe 44 is normally urged into engagement with the flange 43 through the medium of a spring 46 suitably anchored at one end to the plate 13 at the inner side of the plate. The free end of the spring 46 bears against the shoe 44 for urging the same into engagement with the flange 43 as shown in Figure 4.

To the free end of the brake shoe 44 there is pivoted as at 47 a lever 48 which at its free end extends through a slot 49 provided therefor in the plate 13. The outer free end of the link or lever 48 is pivoted as at 50 to a pivotally mounted operating handle 51 arranged substantially tangential to the annular member 10. (See Figure 1.)

As is thought apparent, during the unwinding of the spring 18, the winding of the fishing line on the spool may be controlled by manually moving the brake shoe 44 into and out of engagement with the flange 43 for interrupting the winding of the line on the spool 33. For suspending the reel vertically from the handle 52 of a conventional type of fishing rod, a portion of which is shown in Figure 1, there is provided a substantially channel shaped bracket 53 the sides of which are bolted between the annular member 10 and the plates 12, 13, said sides having arcuate lower edges and merging at one end into relatively short extension 54, and relatively longer curved extensions 55 at the opposite ends thereof.

The web or top portion of the channel shaped bracket at its end merges into offset extensions 56 that have concaved upper faces for conformably engaging the under face of a portion of the fishing rod handle 52. The ends 56 are secured to the handle 52 through the medium of retaining bands or straps 57 embracing the handle 52 and the extensions 56.

From the foregoing then it will be seen that I have devised a fishing reel that is suspended from the handle of the fishing rod and which when so suspended will project but slightly from opposite sides of the handle, and which will serve to suitably balance the handle of the fishing rod in the hand as to prevent the handle against rotative movement while held in the hand. In explaining the operation and action of my reel, when the angler starts fishing he unwinds the line from the reel spool a sufficient length to make the intended cast. In stripping the line from the reel, it causes the spool to rotate on its axle and as the spool is connected to the rewinding spring through the various gears the unwinding line causes the spool to rotate in the opposite direction to that when rewinding, thus causing the spring to be wound up.

The brake is set in position against the brake flange to hold the spool from turning in any direction. The ratchet on the end of the spindle holds the spring otherwise from rewinding. When a cast has been made, and a fish is hooked on the end of the line, the angler has only to release the brake and the spring will rewind the line. If he so wishes, he can hold the brake in release position and let the spring tension tire the fish.

When a fish makes a run while hooked, he takes the line with him, which unwinds from the reel spool. This action winds the spring all the tighter, and in the event he takes line enough from the spool to wind spring to its limit, the clutch plays its part by letting the spool continue to turn by slipping between the clutch plates. But it does not at any time disengage the spool from gears or spring. The purpose of the spring is to wind up the line at the angler's will, and relieves him of any further attention to his reel while angling.

Even though I have herein shown and described the preferred embodiment of the invention, it is to be understood that the same is susceptible of changes, modifications and improvements coming within the scope of the appended claim.

Having thus described my invention, what I claim as new is:

A fishing reel comprising a casing, a flanged disk connected to one side of the casing, a shaft journalled in the casing and in said disk, a ratchet wheel connected to the shaft and located in the chamber formed by the flanged disk, the flange of said disk having a slot therein, a spring pressed dog located in the chamber and having one end passing through the slot, and its other end engaging the ratchet wheel, a stub shaft carried by that side of the casing which is enclosed by the disk, a hub rotatably arranged on the stub shaft and having a pinion and a gear thereon, a sleeve rotatably arranged on the shaft, a gear connected with the sleeve for meshing with the pinion, a spool having its hub rotatably arranged on the sleeve and having a pinion at one end thereof meshing with the gear, that side member of the spool adjacent the pinion on the hub thereof, having an outwardly extending flange forming a brake drum, an arcuate-shaped brake member for engaging the drum, manually operated means for actuating the brake member, a spring carried by that side of the casing which is opposite the side engaged by the flanged disk, a hub secured to the adjacent end of the shaft and to which the inner end of the spring is connected, clutch means between said hub and the sleeve for imparting a winding action to the spring when the line is being drawn from the spool and for rewinding the line on the spool by the unwinding action of the spring, and means whereby the spool will slip on the sleeve when the spring is fully wound and the line is being drawn from the spool.

In testimony whereof I affix my signature.

GEORGE LOUIS PHILLIPPE.